O. COLVIN.
BEE-HIVE.
No. 175,034.
Patented March 21, 1876.
2 Sheets—Sheet 1.
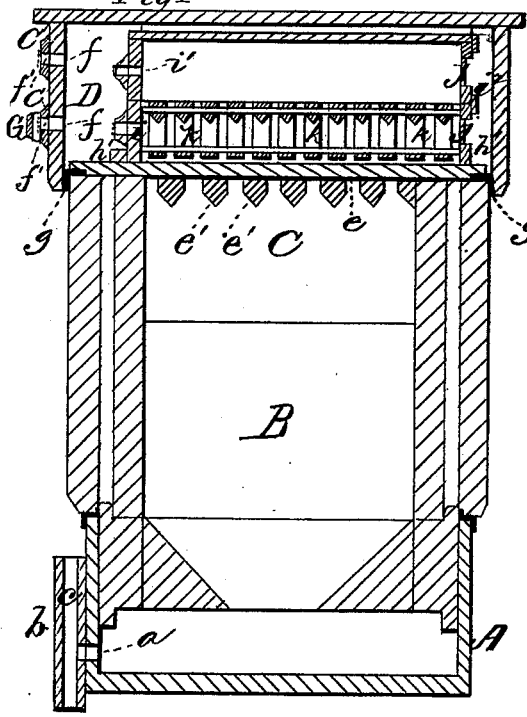
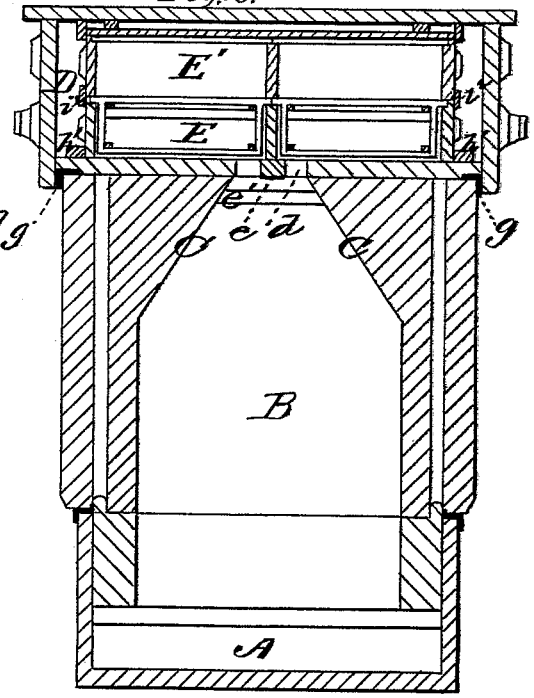
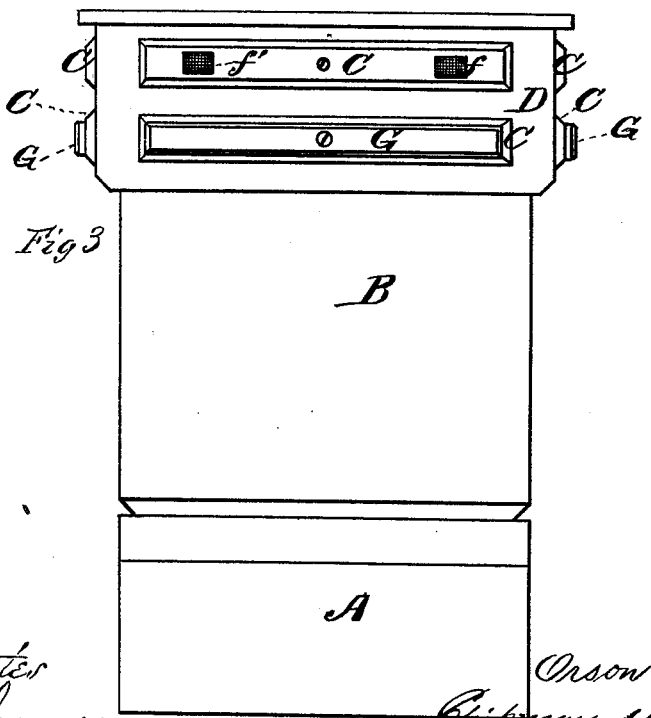
WITNESSES
INVENTOR
Orson Colvin
ATTORNEYS

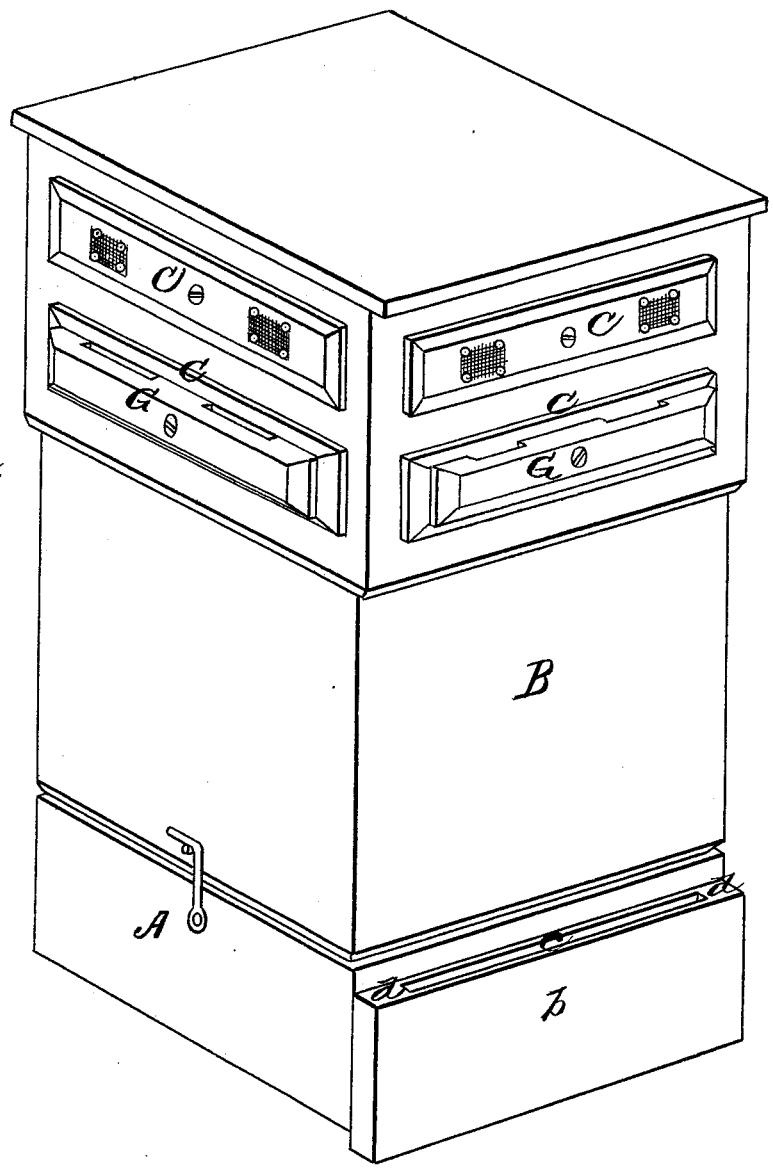

UNITED STATES PATENT OFFICE.

ORSON COLVIN, OF VICKSBURG, MICHIGAN, ASSIGNOR OF ONE-HALF HIS RIGHT TO JOHN R. HAWKINS.

IMPROVEMENT IN BEE-HIVES.

Specification forming part of Letters Patent No. 175,034, dated March 21, 1876; application filed January 15, 1876.

*To all whom it may concern:*

Be it known that I, ORSON COLVIN, of the village of Vicksburg, in the county of Kalamazoo and State of Michigan, have invented a new and valuable Improvement in Bee-Hives; and I do hereby declare that the following is a full, clear, and exact description of the construction and operation of the same, reference being had to the annexed drawings, making a part of this specification, and to the letters and figures of reference marked thereon.

Figures 1 and 2 of the drawings are representations of vertical sections of my bee-hive, and Fig. 3 is a side elevation of the same. Fig. 4 is a perspective view thereof.

This invention has relation to improvements in box bee-hives; and it consists, mainly, in combining with an outer box-section seated upon the brood-chamber and provided with openings covered by a turn-button having gauze-covered apertures adapted to register with the openings in the box-section above mentioned, two or more surplus honey-section boxes arranged the one above the other within the said box, and provided upon their sides or ends, or both, with gauze-covered apertures, whereby, in warm weather, an upward draft will be created, inducing the bees to build their combs rather in the surplus sections than in the brood-chamber below, thereby avoiding the encumbering of the latter, which draft may be increased or lessened at pleasure. It also consists in certain other arrangements and constructions of the minor devices used, as will be hereinafter more fully set forth.

In the annexed drawings, the letter A designates a preferably rectangular base having a closed bottom, and in its side or front bee-entrances $a$, which are covered by a flat board, $b$, held away from the base, so as to form a moth-trap, $c$, by means of strips $d$. The space thus formed being open above and below, will admit light from above, and the moths, being attracted by this light, will enter below, and, instead of passing through entrances $a$ into the hive, will pass between the board and base again into the open air. Upon this base is seated the brood-chamber B, provided with a doubly-inclined tapering roof, C, having a slit, $d$, in its upper end, which is partially closed by a longitudinal wooden strip, $e$, and spaced transverse blocks $e'$, thus forming a species of grating through which the bees will penetrate into the surplus honey-chamber D, the uppermost of my hive. This chamber is provided upon its sides and ends with one or more sets of horizontal perforations, $f$, registering with similar gauze-covered perforations $f'$ in vertically-vibrating buttons C', when the said buttons are in a horizontal position. Perforations $f'$ are gauze-covered, and will allow free ventilation when they register with those in the box-section D. This chamber fits snugly over the brood-chamber B, the necessary tightness of their joint being secured by means of an interposed rubber strip, $g$, which is clamped upon the upper edge of the said brood-chamber when its top is nailed or screwed on. This top or lid is provided with guard-strips $h'$, forming three sides of a square, between which is placed a surplus honey-frame case, E, open at top and bottom, closed on three sides by wooden walls and on the fourth by a glass strip, $j$, through which the condition of the honey-frames $k$ may be inspected. The wooden walls of this case are provided with gauze-covered openings $i$, on a level, or nearly so, with the openings $f$ in the outer casing D, above described, as are also those of a superimposed case, E', which is received between guard-strips $i^2$ on the upper edge of case E, as shown in Fig. 1.

In practice, the upper part of case E' will be closed when two only are used; but if I should prefer to use three or more the second case will be open both top and bottom, and the uppermost comb-frame case only will have its top closed. Section-box D is passed over cases E E', as shown in Fig. 1, the gauze-covered openings therein registering with the openings $i\ i^1$ in the said section-boxes E E'. Consequently an upward current of air for ventilating the hive will pass up through the brood-chamber B into the comb-frame cases E E', passing through which it will escape through perforations $i\ i^1$ therein and $f$ in the outer box D into the open air. In warm climates all these ventilating-apertures will not be more than necessary, but during cold weather or in cold climates it will be requisite to close some of them in order to keep the interior of the hive warm. This will be accomplished by turning a sufficient number of the buttons C so as to throw the gauze-covered apertures $f'$ in the said buttons out of line with those $f$ in box D, when the draft through these openings will be cut off entirely.

In order to prevent too much light from entering the upper part of the hive—that is to say, the surplus comb-chambers E E'—as many of the buttons C as may be requisite will be covered with a raised shield, G, which, while allowing all due ventilation to be had, will cut off the light when necessary. These shield-plates are pivoted to the buttons, and will thus have vibration independent thereof; consequently they can be turned so as to allow the fullest supply of light.

What I claim as new, and desire to secure by Letters Patent, is—

1. In combination with the comb-frame cases E E', having gauze-covered openings $i\ i^1$, the outer case D, having perforations $f$, and the buttons C', having gauze-covered openings $f'$, substantially as specified.

2. In combination with the buttons C' for cutting off or allowing draft from below upward through a hive, the shields G for excluding undue light, substantially as specified.

In testimony that I claim the above I have hereunto subscribed my name in the presence of two witnesses.

ORSON COLVIN.

Witnesses:
 ISAAC M. FLINT,
 I. A. OLMSTEAD.